(12) United States Patent
Ueno

(10) Patent No.: US 7,853,736 B2
(45) Date of Patent: Dec. 14, 2010

(54) EXTENDING EXISTING REQUEST COMMANDS OF IEEE 1394 BY ADDING EXTENDED REQUEST COMMAND HAVING HIGHEST PRIORITY

(75) Inventor: Hirotaka Ueno, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 237 days.

(21) Appl. No.: 11/905,224

(22) Filed: Sep. 28, 2007

(65) Prior Publication Data

US 2008/0082703 A1  Apr. 3, 2008

(30) Foreign Application Priority Data

Sep. 28, 2006  (JP) .............................. 2006-265234

(51) Int. Cl.
  G06F 5/00 (2006.01)
  G06F 3/00 (2006.01)
  G06F 7/38 (2006.01)
(52) U.S. Cl. .............................. 710/40; 710/37; 712/244
(58) Field of Classification Search .................. 710/40, 710/37; 712/244
  See application file for complete search history.

(56) References Cited

U.S. PATENT DOCUMENTS 5,983,301 A * 11/1999 Baker et al. ................. 710/113
6,219,627 B1 * 4/2001 Bonneau et al. ................. 703/1
2003/0069979 A1 * 4/2003 Horiguchi .................... 709/227
2008/0229084 A1 * 9/2008 Wei et al. ..................... 712/244

FOREIGN PATENT DOCUMENTS

JP   10-336252 A   12/1998

* cited by examiner

Primary Examiner—Henry W Tsai
Assistant Examiner—Hyun Nam
(74) Attorney, Agent, or Firm—Fujitsu Patent Center

(57) ABSTRACT

A data transfer device arranged in a node for connection in compliance with a communication standard. The data transfer device includes a request signal generation circuit for generating request signals defined by the communication standard with different levels of priority. A determination circuit determines the request signal having the highest level of priority. Priority is given to the transfer of data corresponding to the request signal determined to have the highest level of priority by the determination circuit. A top priority request signal generation unit generates a top priority request signal that differs from the request signals defined by the communication standard. The determination circuit includes a priority determination table in which the uppermost priority request signal is set to have a level of priority that is higher than the levels of priority of the plurality of existing request signals.

9 Claims, 5 Drawing Sheets

| Priority | Request Command | RQ1a, RQ1b | X1a, X1b, X0 |
|---|---|---|---|
| High | Express | 1111 | 110 |
| ↑ | BusReset | 0100 | 011 |
| | Immediate | 0010 | 010 |
| | CycleStart | 0001 | 001 |
| | ISO_EVEN | Other 4-bit Values | Other 3-bit Values |
| | ISO_ODD | | |
| | PH_CURRENT | | |
| ↓ | PH_EVEN | | |
| Low | PH_ODD | | |

Arbiter Operation

Non-arbiter Operation

EXTENDING EXISTING REQUEST COMMANDS OF IEEE 1394 BY ADDING EXTENDED REQUEST COMMAND HAVING HIGHEST PRIORITY

CROSS-REFERENCE TO RELATED APPLICATIONS

This application is based upon and claims the benefit of priority from prior Japanese Patent Application No. 2006-265234, filed on Sep. 28, 2006, the entire contents of which are incorporated herein by reference.

BACKGROUND

A serial data transfer device using an IEEE 1394 serial bus is used in a multimedia environment and various types of environments. The IEEE 1394 standard is a communication standard for a serial interface that electrically couples a personal computer to peripheral devices, such as a digital video camera or a color printer that processes a large amount of audio data and image data.

When using an IEEE 1394 interface, each individual device (hereafter referred to as a "node") is able to function as an arbiter. Thus, the IEEE 1394 interface eliminates the need for a special host controller. Further, the IEEE 1394 interface enables nodes to be connected in a daisy-chain topology, a tree topology, or a combination of these topologies. The IEEE 1394 interface enables nodes to be connected without any restriction posed by the layout of a host computer or by the topology connecting the nodes. Therefore, the IEEE 1394 interface provides greater degree of freedom for constructing a network.

An IEEE 1394 communication protocol (hereafter simply referred to as "protocol") is used when performing communication through the IEEE 1394 interface.

The IEEE 1394 protocol includes an isochronous transfer mode that requires data to be transferred in constant cycles (125 microseconds). If image (moving image) data were to be transferred to a computer at irregular timings, discontinuous images (moving images) lacking reality may be reproduced. Accordingly, image data (moving image) is transferred at constant timings using the isochronous transfer mode of the IEEE 1394 protocol so as to reproduce images (moving images) having reality.

In addition to the isochronous transfer mode, the IEEE 1394 protocol further includes an asynchronous transfer mode. The asynchronous transfer mode transfers data using free time during which packets (isochronous packets) are not transferred in the isochronous cycles. More specifically, the asynchronous transfer mode is used to transfer data that is not constrained by the transfer timing so that the transfer of such data does not affect the isochronous transfer mode, which requires data to be transferred in constant cycles.

When performing communication under the IEEE 1394 protocol, a node must issue a bus request (transmission right request) and obtain permission for transferring data in communication packets. Priorities are assigned to bus requests issued by nodes in a network. The nodes in the network are guaranteed non-biased communication based on the priorities of their bus requests.

The nodes may need to transfer various types of data. Some types of data may not be able to satisfy their requirements when transferred under the IEEE 1394 protocol.

Japanese Laid-Open Patent Publication No. 10-336252 describes an example of a data transfer controller that uses the isochronous transfer mode to transfer data to many nodes in a network. In this case, if the network includes a node of which capability for receiving data is low, a node that transmits data is forced to transfer data at a low transfer rate in accordance with the node having the low data receiving capability. This would reduce the amount of data transferred in the entire system and lower the utilization efficiency of the system bus.

A method has been proposed to overcome this disadvantage. In this method, a data transfer node transfers data at a normal transfer rate, and another node temporarily stores the data in a FIFO. From the FIFO, the node retrieves the portion of the data that can be transmitted at a low rate in compliance with the node having the low data receiving capability and transfers the retrieved data portion in the isochronous transfer mode. The remaining data in the FIFO is then transferred in the asynchronous transfer mode to the node having the low data receiving capability.

This method enables data to be transferred to a node having a low data receiving capability without lowering the data transfer efficiency in the entire system or the utilization efficiency of the system bus.

In a network including a plurality of nodes, there may be a case in which one node must transfer data having a higher level of priority than the data transferred by another node. However, the IEEE 1394 interface performs half-duplex communication. Thus, if one node issues a request for high priority transmission of data while another node is transferring data, the request would not be accepted until the data transfer ends.

Over these recent years, a data transfer device that uses an IEEE 1394b serial bus has been proposed. The IEEE 1394b serial bus is an improvement of the IEEE 1394 and has a full-duplex function. Due to the full-duplex function of the IEEE 1394b, if one node issues a request for the transmission of data, the request would be accepted even if another node is transferring data. However, the object of the IEEE 1394b serial bus is to provide each node with a non-biased opportunity for communication. When a node issues a request for high priority transmission of data, the priority for that request may be the same as that of a transmission request issued by another node. In such a case, the node of the data having high priority is not necessarily given priority for the transmission of data. Thus, even if a node has to transfer data with high priority, the node must wait in a queue to transfer data in accordance with the priority determined by the IEEE 1394b communication protocol.

However, for example, when transferring data related with machine control or when transferring data for an automobile LAN, it is desirable that the data transfer start as soon as possible and end within a short period of time. The IEEE 1394b communication protocol cannot satisfy such a demand. Accordingly, there is a demand for a protocol that can satisfy such a demand.

SUMMARY

It is an aspect of the embodiments discussed herein to provide a data transfer device including a request signal generation circuit generating a plurality of request signals with different levels of priority, a determination circuit determining the request signal that has the highest level of priority, and a top priority request signal generation unit arranged in the request signal generation circuit generating a top priority request signal that differs from the plurality of request signals, wherein the determination circuit includes a priority determination table in which the uppermost priority request signal is set to have a level of priority that is higher than the levels of priority of the plurality of existing request signals.

Other aspects and advantages will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment will now be described with reference to FIGS. 1 to 4.

Figure 1:
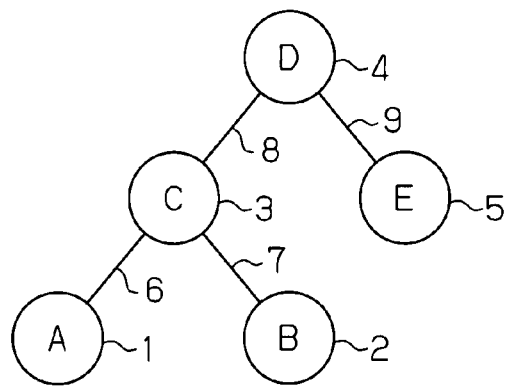
FIG. 1 is a block diagram of a data transfer system.

FIG. 1 is a block diagram of a data transfer system that complies with the IEEE 1394b protocol, which is a full-duplex communication standard. The system includes an A-node 1, a B-node 2, a C-node 3, a D-node 4, and an E-node 5. Examples of the nodes 1 to 5 include personal computers, digital video cameras, printers, and other devices complying with the IEEE 1394b standard. The nodes 1 to 5 each include a data transfer device 11 (refer to FIG. 2) that enables data transfer complying with the IEEE 1394b protocol. The nodes 1 to 5 form a daisy-chain topology or a tree bus topology with bus cables 6 to 9.

The data transfer device 11 in each of the nodes 1 to 5 for enabling data transfer that complies with the IEEE 1394b protocol will now be described. In the preferred embodiment, the data transfer devices 11 of the nodes 1 to 5 all have the same structure. Thus, only the data transfer device 11 of the D-node 4 will be described.

Figure 2:
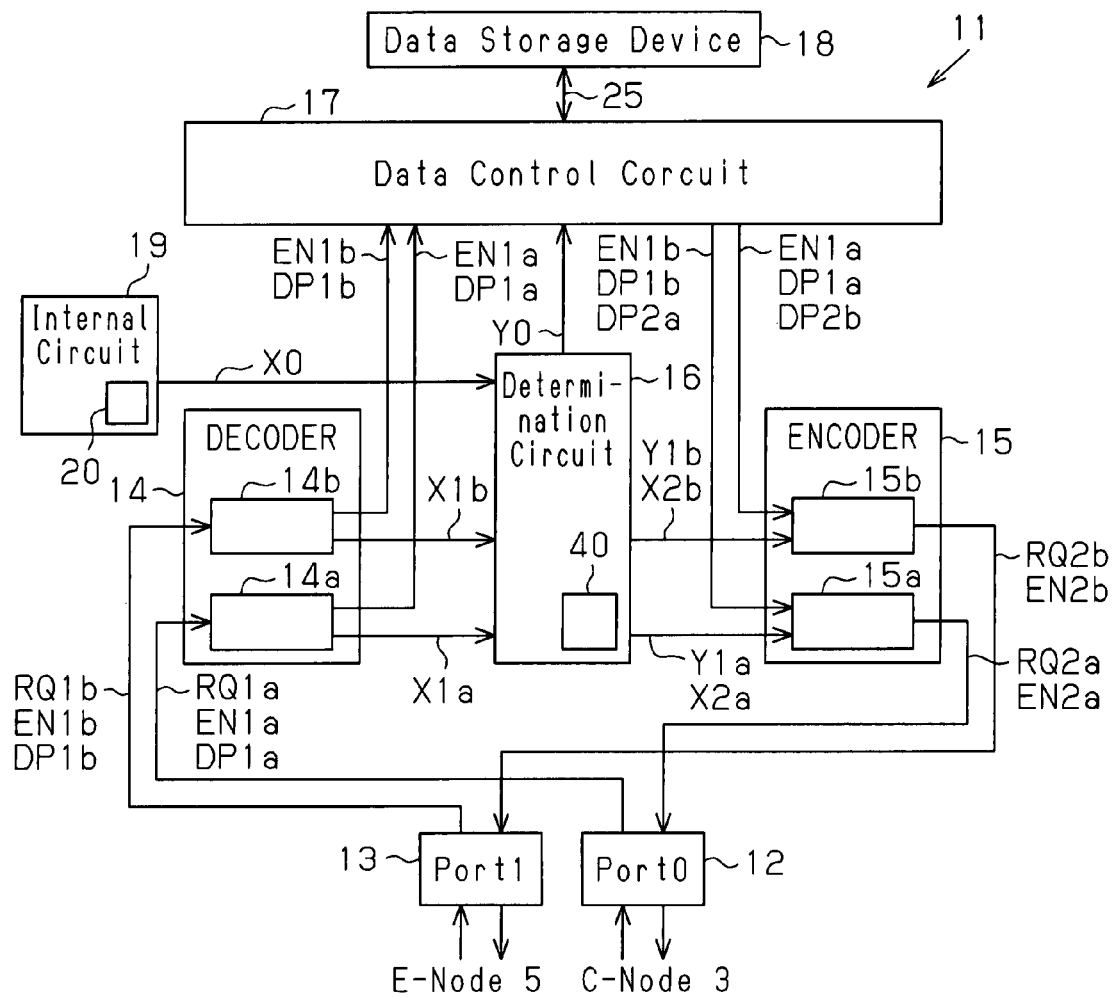
FIG. 2 is a block diagram of a data transfer device according to a preferred embodiment.

FIG. 2 is a block diagram showing the data transfer device 11 that complies with IEEE 1394b.

The data transfer device 11 includes a zeroth port 12, a first port 13, a decoder 14, an encoder 15, a determination circuit 16, and a data control circuit 17. The data transfer device 11 further includes a data storage device 18, an internal circuit 19, and a top priority request signal generation unit 20. The decoder 14 is also referred to as a request signal detection circuit. The encoder 15 is also referred to as a request signal transfer circuit. The determination circuit 16 is also referred to as a transmission enable signal generation circuit. The internal circuit 19 and the uppermost priority request signal generation unit 20 is also referred to as a request signal generation circuit.

The zeroth port 12 and the first port 13 are ports that comply with the IEEE 1394b standard and connect the data transfer device 11 to the IEEE 1394b serial bus. The port 12 is connected by the bus cable 8 to a port of the C-node 3 that complies with IEEE 1394b, and the port 13 is connected by the bus cable 9 to a port of the E-node 5 that complies with IEEE 1394b.

The decoder 14 includes a zeroth port decoder 14a and a first port decoder 14b.

The zeroth port decoder 14a receives various request commands from the C-node 3 via the zeroth port 12. The first port decoder 14b receives various commands from the E-node 5 via the first port 13.

The request commands may include existing request commands such as "bus reset", "immediate", "cycle start", "ISO_EVEN", "ISO_ODD", "PH_CURRENT", "PH_EVEN", and "PH_ODD" request commands. In the preferred embodiment, an "express" request command is defined as a new request command in addition to the existing request commands. In the present specification, an existing request command defined by a communication standard is also referred to as a standard request command, and a newly added request command that is not defined by a communication standard is also referred to as an extended request command.

The "bus reset" request command is used to request for a bus reset. The "immediate" request command is used to request for an acknowledge packet. The "cycle start" request command is used to request for transmission of a cycle start packet (CSP). The "ISO_EVEN" and "ISO_ODD" request commands are used to request for permission to transmit an isochronous transfer packet. The "PH_CURRENT", "PH_EVEN", and "PH_ODD" request commands are used to request for permission to transmit an asynchronous transfer packet. The newly defined "express" request command is used to request for immediate data transfer immediately and used to complete data transfer within a short period of time.

Figures 3, 4:
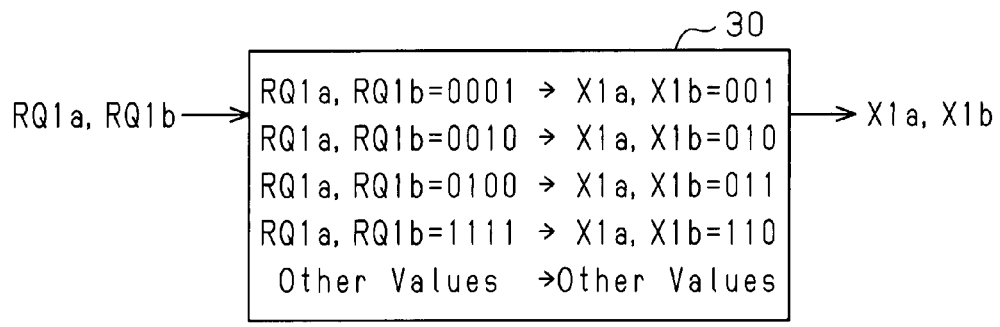
FIG. 3 is a chart showing conversion examples of request codes.
FIG. 4 is a chart showing an example a priority determination table.

The priorities assigned to these request commands will now be described. As shown in FIG. 4, the priority of the request commands from the highest level to the lowest level is "express", "bus reset", "immediate", "cycle start", "ISO_EVEN", "ISO_ODD", "PH_CURRENT", "PH_EVEN", and "PH_ODD.". Although the "bus reset" request command has the highest level of priority among the existing request commands, the "express" request command has the highest level of priority in the preferred embodiment.

The zeroth port decoder 14a receives a request command transferred from the C-node 3, and extracts an external transmission right request signal RQ1a from the received request command. The first port decoder 14b receives a request command transferred from the E-node 5, and extracts an external transmission right request signal RQ1b from the received request command. Each of the external transmission right request signals RQ1a and RQ1b is either a request signal (standard request signal) or a top priority request signal (extended request signal).

The external transmission right request signals RQ1a and RQ1b each indicate the priority of the corresponding request command. The external transmission right request signals RQ1a and RQ1b may be, for example, 4-bit signals.

FIG. 4 shows examples of the 4-bit values of the external transmission right request signals RQ1a and RQ1b corresponding to each request command. For example, the signals RQ1a and RQ1b corresponding to the "express" request command have a bit value of 1111, the signals RQ1a and RQ1b corresponding to the "bus reset" request command have a bit value of 0100, the signals RQ1a and RQ1b corresponding to the "immediate" request command have a value of 0010, and the signals RQ1a and RQ1b corresponding to the "cycle start" request command have a value of 0001. The signals RQ1a and RQ1b corresponding to the "ISO_EVEN", "ISO_ODD", "PH_CURRENT", "PH_EVEN", and "PH_ODD" request commands have other 4-bit values.

For example, the "bus reset", "immediate", "cycle start", "ISO_EVEN", "ISO_ODD", "PH_CURRENT", "PH_EVEN", and "PH_ODD" request commands have the same priority levels as in the related art. However, the "express" request command, which is newly added in the preferred embodiment, is defined as the request command having the highest level of priority.

The external transmission right request signals RQ1$a$ and RQ1$b$ corresponding to the extended request command ("express" request command) of which priority level is higher than the conventional standard request commands have a bit value of 1111. The bit value of 1111 indicates a higher level of priority than the bit value of the standard request command that indicates the highest level of priority among all of the standard request commands (the bit value of 0100 of the "bus reset" request command). The other 4-bit values are assigned to the standard request commands, such as the "ISO_EVEN" request command, having low levels of priority.

In the related art, the priority for data transfer is separated into a predetermined number of levels, for example, four levels. For example, the priority of the 4-bit external transmission right request signals RQ1$a$ and RQ1$b$ is indicated from the highest level by the bit values of 0100, 0010, 0001, and the other 4-bit values. In the preferred embodiment, a priority level higher than the conventional priority levels is set, and data transfer is performed based on, for example, five priority levels, which is greater by one level than the conventional priority levels.

For example, with the external transmission right request signals RQ1$a$ and RQ1$b$, the bit value of 1111 has the highest level of priority. This is followed by the bit values of 0100, 0010, and 0001. The external transmission right request signals RQ1$a$ and RQ1$b$ with the other 4-bit values have a lower priority than the external transmission right request signals RQ1$a$ and RQ1$b$ having the above four values.

The port decoders 14$a$ and 14$b$ decode the 4-bit external transmission right request signals RQ1$a$ and RQ1$b$ in accordance with a decode table 30 to generate 3-bit decoded request signals X1$a$ and X1$b$. Then, the port decoders 14$a$ and 14$b$ provide the decoded request signals X1$a$ and X1$b$ to the determination circuit 16.

A conventional decoder decodes four sets of 4-bit external transmission right request signals RQ1$a$ and RQ1$b$ to generate four sets of 3-bit decoded request signals X1$a$ and X1$b$. However, each of the port decoders 14$a$ and 14$b$ decodes five sets of 4-bit external transmission right request signals RQ1$a$ and RQ1$b$ to generate five sets of decoded request signals X1$a$ and X1$b$. More specifically, the port decoders 14$a$ and 14$b$ convert the external transmission right request signals RQ1$a$ and RQ1$b$ having the bit value of 1111 for the newly added "express" request command to the decoded request signals X1$a$ and X1$b$ having a bit value of 110.

The zeroth port decoder 14$a$ receives a transmission enable signal EN1$a$ transferred from the C-node 3 via the zeroth port 12 and provides the transmission enable signal EN1$a$ to the data control circuit 17. The first port decoder 14$b$ receives a transmission enable signal EN1$b$ transferred from the E-node 5 via the first port 13 and provides the transmission enable signal EN1$b$ to the data control circuit 17.

The zeroth port decoder 14$a$ receives a data packet signal DP1$a$ from the C-node 3 via the zeroth port 12 and provides the data packet signal DP1$a$ to the data control circuit 17. The first port decoder 14$b$ receives a data packet signal DP1$b$ from the E-node 5 via the first port 13 and provides the data packet signal DP1$b$ to the data control circuit 17.

The decoder 14 provides transmission enable signals EN1$a$ and EN1$b$ to the data control circuit 17. The data control circuit 17 determines whether the received transmission enable signals EN1$a$ and EN1$b$ are addressed to itself.

When the received transmission enable signals EN1$a$ and EN1$b$ are addressed to another node, the data control circuit 17 transfers the transmission enable signals EN1$a$ and EN1$b$ to the next node. For example, when the transmission enable signal EN1$a$ received at the zeroth port 12 is addressed to another node, the data control circuit 17 provides the transmission enable signal EN1$a$ to a first port encoder 15$b$ to transfer the transmission enable signal EN1$a$ from the first port 13 to the E-node 5.

When the transmission enable signal EN1$b$ received at the first port 13 is addressed to another node, the data control circuit 17 provides the transmission enable signal EN1$b$ to a zeroth port encoder 15$a$ to transfer the transmission enable signal EN1$b$ from the zeroth port 12 to the C-node 3.

When the received transmission enable signals EN1$a$ and EN1$b$ are addressed to itself, that is, node 4, the data control circuit 17 determines that node 4 is given permission to transmit data (transmission permission). In this case, the data control circuit 17 does not transfer the transmission enable signals EN1$a$ and EN1$b$ to another node and starts data transfer from node 4. For example, the data control circuit 17 reads the data that is to be transferred to other nodes 1 to 3 from the data storage device 18 via a data line 25. Then, the data control circuit 17 generates a data packet signal for transferring the data. The data control circuit 17 provides the zeroth port encoder 15$a$ with a transfer data packet signal DP2$a$ that is to be transmitted to one of the A, B, and C-nodes 1 to 3 and provides the first port encoder 15$b$ with a transfer data packet signal DP2$b$ that is to be transmitted to the E-node 5.

The data control circuit 17 determines whether the data packet signals DP1$a$ and DP1$b$ received from the decoder 14 are addressed to itself, that is, node 4, and transfers the data packet signals DP1$a$ and DP1$b$ to either the C-node 3 or the E-node 5. For example, the data control circuit 17 provides the first port encoder 15$b$ with the data packet signal DP1$a$ received by the zeroth port 12 and outputs the data packet signal DP1$a$ from the first port 13. The data control circuit 17 provides the zeroth port encoder 15$a$ with the data packet signal DP1$b$ received by the first port 13 and outputs the data packet signal DP1$b$ from the zeroth port 12.

When the data packet signals DP1$a$ and DP1$b$ are addressed to itself, that is, node 4, the data control circuit 17 retrieves the payload of data in the data packet signals DP1$a$ and DP1$b$ and stores the retrieved data into the data storage device 18.

The determination circuit 16 has a priority determination table 40 (FIG. 4). The determination circuit 16 determines the priority of each of the 3-bit decoded request signals X1$a$ and X1$b$ received from the zeroth port decoder 14$a$ and the first port decoder 14$b$ by referring to the priority determination table 40. The determination circuit 16 may receive an internal request signal (transmission enable request signal) X0 identical to the decoded request signals X1$a$ and X1$b$ from an internal circuit (not shown) of its data transfer device 11. The determination circuit 16 further determines the priority of the internal request signal X0 by referring to the priority determination table 40.

An internal circuit of a conventional data transfer device generates and outputs, for example, four internal request signals X0 corresponding to the request commands. For example, the conventional internal circuit generates an internal request signal X0 having a bit value of 011 corresponding to the "bus reset" request command, an internal request signal X0 having a bit value of 010 corresponding to the "immediate" request command, an internal request signal X0 having a bit value of 001 corresponding to the "cycle start" request command, and an internal request signal X0 having other 3-bit values corresponding to each of the "ISO_EVEN", "ISO_ODD", "PH_CURRENT", "PH_EVEN", and "PH_ODD" request commands.

In the preferred embodiment, the internal circuit 19 of the data transfer device 11 includes the uppermost priority request signal generation unit 20. The uppermost priority request signal generation unit 20 generates the newly added "express" request command, which is not defined by the communication standard such as the IEEE 1394b standard. An internal request signal X0 corresponding to the "express" request command has the bit value of 110. More specifically, the internal circuit 19 of the data transfer device 11 generates and outputs, for example, five types of internal request signals X0, which is greater by one type as compared with the related art.

The determination circuit 16 determines which one of the received request signals X1a, X1b, and X0 has the highest level of priority by referring to the priority determination table 40.

As shown in FIG. 4, the priority determination table 40 defines the levels of priority assigned to the request commands. The level of priority for the request commands from the highest one is in the order of the "express", "bus reset", "immediate", "cycle start", "ISO_EVEN", "ISO_ODD", "PH_CURRENT", "PH_EVEN", and "PH_ODD" request commands.

The "express" request command is not defined in the related art. Thus, the "bus reset" request command has the highest level of priority among the conventional request commands. In the preferred embodiment, the newly added "express" request command has a higher level of priority than the "bus reset". The "express" request command is used to immediately start data transfer and complete the data transfer within a short period of time.

The priority determination table 40 defines the levels of priority for the request commands of the decoded request signal X1a, the decoded request signal X1b, and the internal request signal X0, with the order from the highest level of priority level being 110, 011, 010, 001, and the other 3-bit values.

The data transfer device 11 has a bus arbitration function. The data transfer device 11 functions as an arbiter at certain times and does not function as an arbiter during other times. When the data transfer device 11 functions as an arbiter, the determination circuit 16 executes arbiter control. When the data transfer device 11 is not functioning as an arbiter, the determination circuit 16 does not execute arbiter control.

When the determination circuit 16 executes the arbiter control, the determination circuit 16 determines which one of the request signals X1a, X1b, and X0 corresponding to the request command has the highest level of priority. The determination circuit 16 provides a transmission enable signal Y1a to the zeroth port encoder 15a connected to the zeroth port 12 when the decoded request signal X1a received from the C-node 3 has the highest level of priority. The determination circuit 16 provides a transmission enable signal Y1b to the first port encoder 15b connected to the first port 13 when the decoded request signal X1b received from the E-node 5 has the highest level of priority. The determination circuit 16 provides a transmission enable signal Y0 to the data control circuit 17 of its node 14 when the internal request signal X0 of its node 4 has the highest level of priority.

When the determination circuit 16 does not execute the arbiter control, the determination circuit 16 provides the determination result to the port (12 or 13) to which an arbiter is directly or indirectly connected.

The data transfer device 11 constantly identifies the port (12 or 13) to which the arbiter is connected. This is enabled by a communication management unit (not shown) transmitting bus management information. The data transfer device 11 temporarily stores arbiter information including arbiter direction information (the side of the port 12 or the side of the port 13). The determination circuit 16 refers to the arbiter information.

When, for example, the decoded request signal X1a received from the C-node 3 has the highest level of priority, the determination circuit 16 refers to the arbiter information to determine that the arbiter is connected to the first port 13 to which the E-node 5 is connected. As a result, the determination circuit 16 directly provides the first port encoder 15b, for example, with the 3-bit decoded request signal X1a as the 3-bit priority request signal X2b together with the request command corresponding to the decoded request signal X1a.

When the decoded request signal X1b received from the E-node 5 has the highest level of priority, the determination circuit 16 refers to the arbiter information and determines that the arbiter is connected to the zeroth port 12 to which the C-node 3 is connected. As a result, the determination circuit 16 directly provides the zeroth port encoder 15a, for example, with the 3-bit decoded request signal X1b as the 3-bit priority request signal X2a together with the request command corresponding to the decoded request signal X1b.

When, for example, the internal request signal X0 from itself, that is, node 4, has the highest level of priority, the determination circuit 16 refers to the arbiter information to determine the port in the direction the arbiter is connected. As a result, for example, the determination circuit 16 directly provides the internal request signal X0 as the priority request signal X2a to the zeroth port encoder 15a together with the request command corresponding to the internal request signal X0 or directly provides the internal request signal X0 as the priority request signal X2b to the first port encoder 15b together with the request command corresponding to the internal request signal X0.

The encoder 15 includes the zeroth port encoder 15a and the first port encoder 15b. The zeroth port encoder 15a receives the transmission enable signal EN1b from the data control circuit 17 and provides the transmission enable signal EN1b to the C-node 3 via the zeroth port 12. The first port encoder 15b receives the transmission enable signal EN1a from the data control circuit 17 and provides the transmission enable signal EN1a to the E-node 5 via the first port 13.

The zeroth port encoder 15a receives a transfer data packet signal DP2a of its node from the data control circuit 17, and provides the transfer data packet signal DP2a to the C-node 3 via the zeroth port 12. The first port encoder 15b receives a transfer data packet signal DP2b of its node from the data control circuit 17 and provides the transfer data packet signal DP2b to the E-node 5 via the first port 13.

The zeroth port encoder 15a receives the data packet signal DP1b from the data control circuit 17 and provides the data packet signal DP1b to the C-node 3 via the zeroth port 12. The first port encoder 15b receives the data packet signal DP1a from the data control circuit 17 and provides the data packet signal DP1a to the E-node 5 via the first port 13.

The zeroth port encoder 15a receives the transmission enable signal Y1a from the determination circuit 16 and transfers the transmission enable signal Y1a as the transmission enable signal EN2a to the C-node 3 via the zeroth port 12 together with the request command. The first port encoder 15b receives the transmission enable signal Y1b from the determination circuit 16 and transfers the transmission enable signal Y1b as the transmission enable signal EN2b to the E-node 5 via the first port 13 together with the request command.

The zeroth port encoder 15a receives the priority request signal X2a from the determination circuit 16. The first port encoder 15b receives the priority request signal X2b from the determination circuit 16.

Each of the priority request signals X2a and X2b is formed by bits (e.g., three bits) indicating the priority of data transferred between the nodes 1 to 5. In the preferred embodiment, the priority request signals X2a and X2b having the bit value of 110 indicate the highest level of priority.

For example, the priority request signals X2a and X2b having the bit value of 110 indicate the highest level of priority and the bit values of 011, 010, and 001 indicate the following levels of priority. The priority request signals X2a and X2b having the other 3-bit values indicate the low levels of priority.

The port encoders 15a and 15b perform a conversion that is reverse the conversion performed by the port decoders 14a and 14b. More specifically, the port encoders 15a and 15b encode the priority request signals X2a and X2b (e.g., 3-bit signals) received from the determination circuit 16 to generate output transmission right request signals RQ2a and RQ2b (e.g., 4-bit signals). The port encoder 15a transfers the output transmission right request signal RQ2a to the C-node 3 via the zeroth port 12 together with the request command. The port encoder 15b transfers the output transmission right request signal RQ2b to the E-node 5 via the first port 13 together with the request command.

For example, the priority request signals X2a and X2b having the bit value of 110, which indicates the highest level of priority, are converted to the output transmission right request signals RQ2a and RQ2b having the bit value of 1111. The priority request signals X2a and X2b having the bit value of 011 are converted to the output transmission right request signals RQ2a and RQ2b having the bit value of 0100. The priority request signals X2a and X2b having the bit value of 010 are converted to the output transmission right request signals RQ2a and RQ2b having the bit value of 0010. The priority request signals X2a and X2b having the bit value of 001 are converted to the output transmission right request signals RQ2a and RQ2b having the bit value of 0001. The priority request signals X2a and X2b having other 3-bit values are converted to the output transmission right request signals RQ2a and RQ2b having other 4-bit values.

The operation of the data transfer device 11 will now be described with reference to FIGS. 5 and 6.

The operation of the determination circuit 16 that is executing the arbiter control will first be described. To facilitate description, it is assumed here that the decoded request signal X1b corresponding to the new "express" request command, which has the highest level of priority, is generated when the first port decoder 14b decodes the external transmission right request signal RQ1b, which is provided from the E-node 5 and input in the first port 13.

Figure 5:
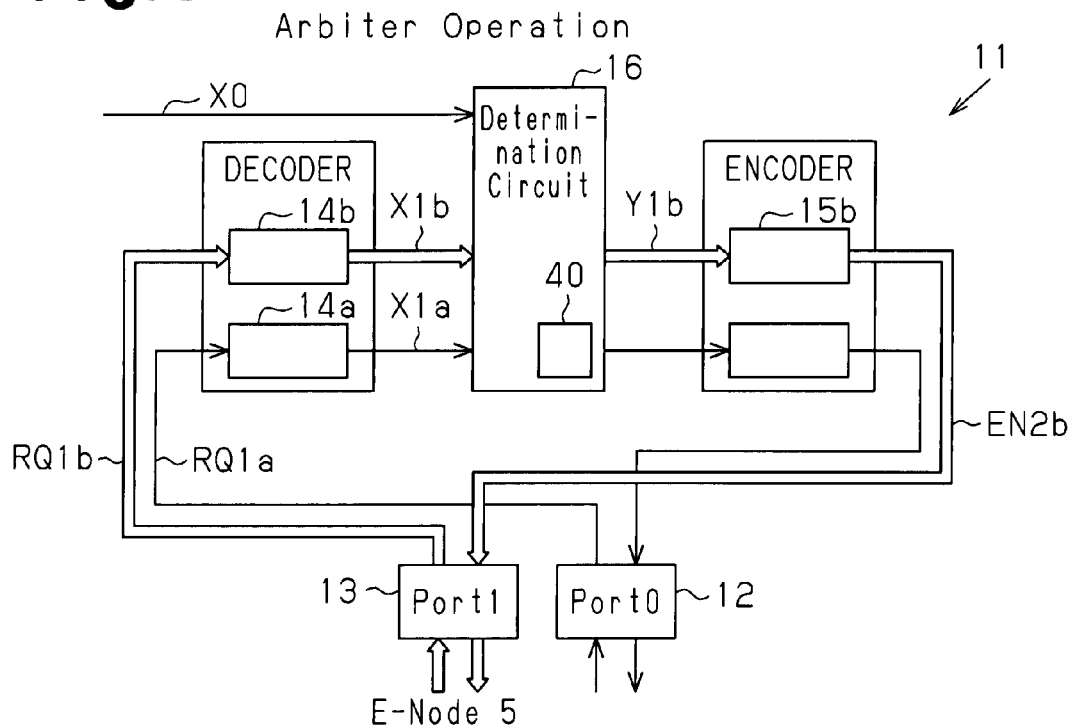
FIG. 5 is a diagram showing an arbiter operation of a data transfer device that is operating as an arbiter.
Figure 6:
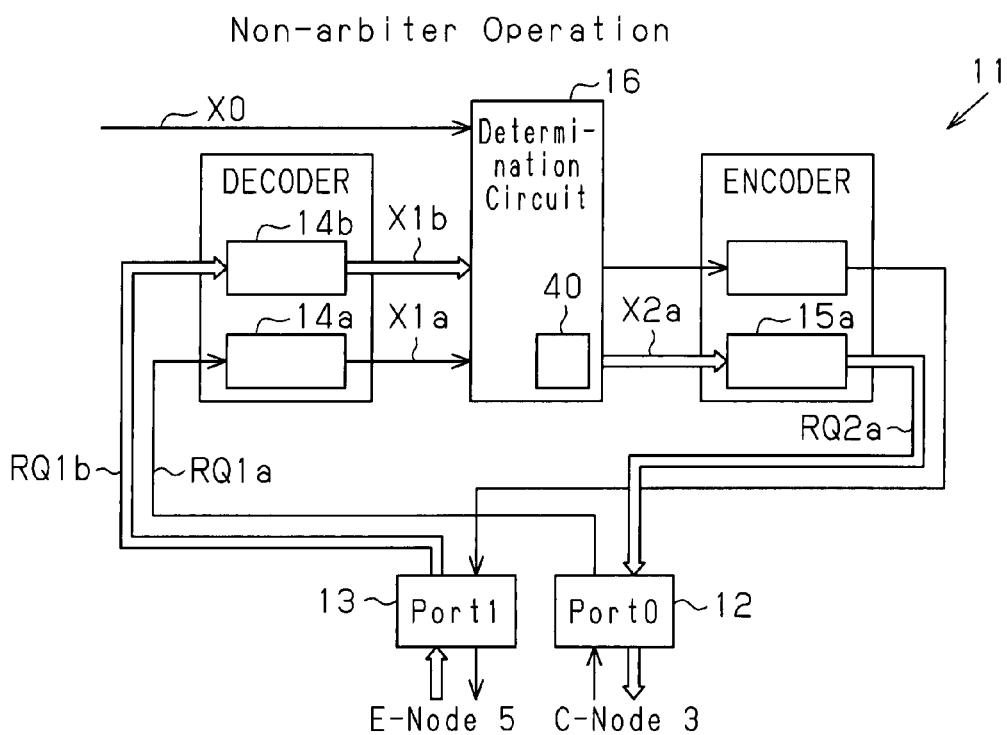
FIG. 6 is a diagram showing a non-arbiter operation of a data transfer device that is not operating as an arbiter.

As shown in FIG. 5, when an external transmission right request signal RQ1b from the E-node 5 is provided to the first port 13, the first port decoder 14b converts the external transmission right request signal RQ1b to the new 3-bit decoded request signal X1b having the highest level of priority and provides the decoded request signal X1b to the determination circuit 16.

When an external transmission right request signal RQ1a from the C-node 3 is provided to the zeroth port 12, the zeroth port decoder 14a converts the external transmission right request signal RQ1a to a 3-bit decoded request signal X1a and provides the decoded request signal X1a to the determination circuit 16.

The determination circuit 16 determines which one of the signals X1a, X1b, and X0 has the highest level of priority by referring to the priority determination table 40. In the example shown in FIG. 5, the decoded request signal X1b has the priority level corresponding to the "express" request command. In this case, the determination circuit 16 determines that the decoded request signal X1b has the highest level of priority.

In this state, the determination circuit 16 is executing the arbiter control. Thus, the determination circuit 16 provides the transmission enable signal Y1b to the first port encoder 15b based on the determination result.

The first port encoder 15b generates a transmission enable signal EN2b based on a transmission enable signal Y1b from the determination circuit 16 and provides the transmission enable signal EN2b to the first port 13. More specifically, the data transfer device 11 functioning as an arbiter transfers the transmission enable signal EN2b generated based on the transmission enable signal Y1b from the first port 13 to the E-node 5.

The operation of the determination circuit 16 that is not executing the arbiter control will now be described with reference to FIG. 6.

When the first port 13 is not directly or indirectly connected to the arbiter, an external transmission right request signal RQ1b from the E-node 5 is provided from the first port 13 to the first port decoder 14b. The first port decoder 14b converts the external transmission right request signal RQ1b to a 3-bit decoded request signal X1b and provides the decoded request signal X1b to the determination circuit 16.

When the zeroth port 12 is not directly or indirectly connected to the arbiter, an external transmission right request signal RQ1a from the C-node 3 is provided from the zeroth port 12 to the zeroth port decoder 14a. The zeroth port decoder 14a converts the external transmission right request signal RQ1a to a 3-bit decoded request signal X1a and provides the decoded request signal X1a to the determination circuit 16.

More specifically, the determination circuit 16 may receive the decoded request signal (X1a or X1b) and an internal request signal X0 from the port (12 or 13) that is in the direction in which the arbiter is not connected.

The determination circuit 16 determines which one of the signals X0, X1a, and X1b has the highest level of priority by referring to the priority determination table 40. In the example shown in FIG. 6, the decoded request signal X1b has the priority corresponding to the "express" request command. In this case, the determination circuit 16 determines that the decoded request signal X1b has the highest level of priority.

In this state, the determination circuit 16 is not executing the arbiter control. Thus, the determination circuit 16 directly provides the decoded request signal X1b as the priority request signal X2a to the zeroth port encoder 15a corresponding to the zeroth port 12. The zeroth port 12 is not connected to the E-node 5, which has transmitted the decoded request signal X1b.

The zeroth port encoder 15a converts the priority request signal X2a having a high level of priority to the corresponding output transmission right request signal RQ2a, and provides the output transmission right request signal RQ2a to the zeroth port 12 together with the request command. More specifically, the data transfer device 11 that is not operating as an arbiter provides the output transmission right request signal RQ2a, which is based on the priority request signal X2a, to the port (e.g., the zeroth port 12) that is in the direction the arbiter is connected.

Figure 7:
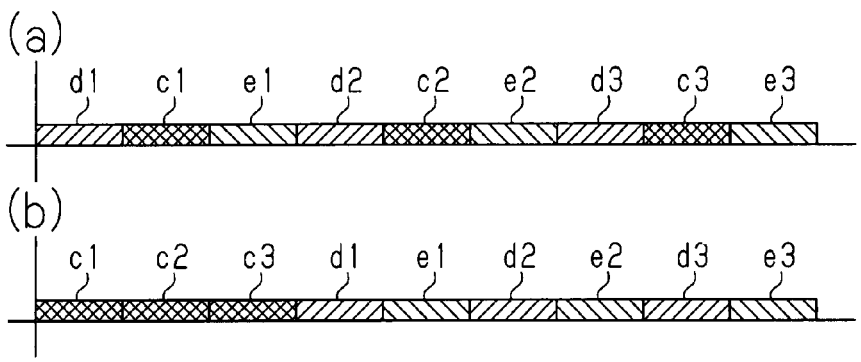
FIGS. 7A, 7B, 8A, 8B, 8C, 9A, and 9B are diagrams showing high-priority transmission of packets c1, c2, and c3.
Figure 8:
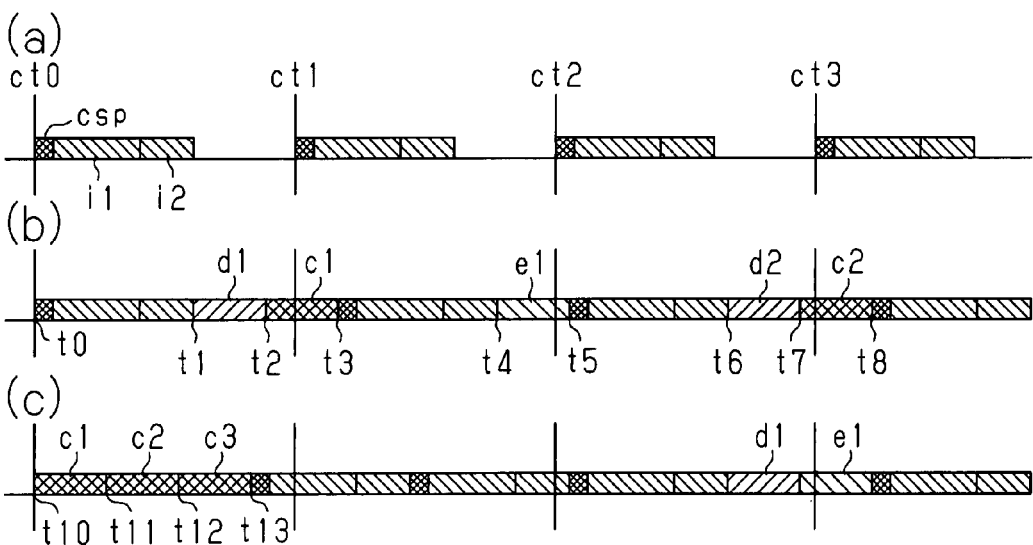
Figure 9:
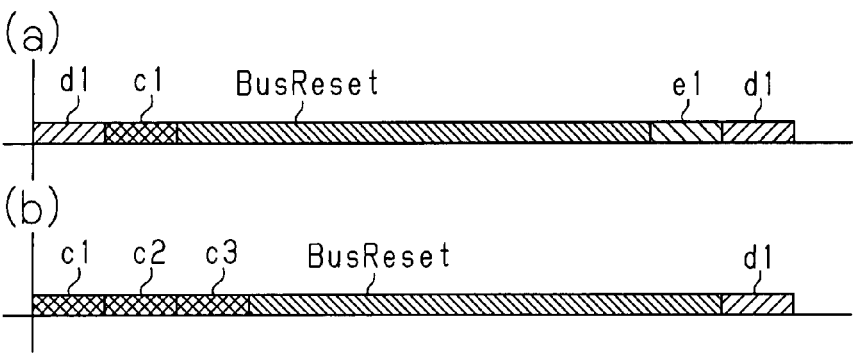

Data transfer between the C-node 3, the D-node 4, and the E-node 5 shown in FIG. 1 will now be described with reference to FIGS. 7 to 9.

Here, it is assumed that the C-node 3 has data that needs to be transferred with the highest level of priority, while the D-node 4 and the E-node 5 have data that needs be transferred but has a low level of priority. The nodes 3 to 5 each transfer data in three packets, each having two kilobytes. The nodes 3 to 5 each include the data transfer device 11.

The C-node 3, the D-node 4, and the E-node 5 each generate the "PH_CURRENT" request command to transfer data in the asynchronous transfer mode and issue a transmission right based on an internal request signal X0 corresponding to the "PH_CURRENT" request command. FIG. 7A chronologically shows the packets transferred through the IEEE 1394b bus in this state.

IEEE 1394b provides request commands having the same level of priority with non-biased priority. Thus, the nodes 3 to 5, each of which has the internal request signal X0, have the same level of priority and are given non-biased opportunities for transferring data.

For example, the D-node 4 is first given the opportunity to transfer data. In this case, the first packet d1 of the D-node 4 is transferred through the bus, and then first packet c1 of the C-node 3 is transferred through the bus. Afterwards, the first packet e1 of the E-node 5 is transferred through the bus. Thereafter, the second packet d2 of the D-node 4, the second packet c2 of the C-node 3, the second packet e2 of the E-node 5, the third packet d3 of the D-node 4, the third packet c3 of the C-node 3, and the third packet e3 of the E-node 5 are transferred sequentially through the bus in the stated order in a non-biased manner.

In this example, the D-node 4 completes the transfer of its entire data when the transfer of seven packets of data ends (packet d3). The C-node 3 completes the transfer of its entire data when the transfer of eight packets ends (packet c3). The E-node 5 completes the transfer of its entire data when the transfer of nine packets ends (packet e3).

As described above, even if the C-node 3 transfers data (three packets) with the highest level of priority, each of the nodes 3 to 5 is given a non-biased opportunity to transfer data. As a result, the C-node 3 requires a data transfer time corresponding to eight packets of data to complete transferring its three packets of data.

An example in which the "express" request command is used will now be described with reference to FIG. 7B. Here, it is assumed that the C-node 3 generates the "express" command having the highest level of priority, and the D-node 4 and E-node 5 generate the same request command having a lower level of priority than the "express" request command. It is also assumed here that each of the C-node 3, the D-node 4, and the D-node 5 requests a transmission right based on the corresponding request command.

The determination circuit 16 of the arbiter first gives the opportunity to transfer data to the C-node 3, which has requested a transmission right based on the request command having the highest level of priority. As a result, the C-node 3 transfers its first packet c1 through the bus. Then, the C-node 3, the D-node 4, and the E-node 5 generate another request for a transmission right. The arbiter again grants transmission permission to the C-node 3 that has requested a transmission right based on the "express" request command having the highest level of priority. As a result, the C-node 3 transfers its second packet c2 through the bus. Then, the arbiter gives another transmission right to the C-node 3, and the C-node 3 transfers its third packet c3 through the bus.

After the C-node 3 completes the transfer of the third packet c3, the arbiter gives a transmission right to each of the D-node 4 and the E-node 5 in a non-biased manner. For example, when a transmission right is first given to the D-node 4, the first packet d1 of the D-node 4 is first transferred through the bus. Then the first packet e1 of the E-node 5 is transferred through the bus. Thereafter, the second packet d2 of the D-node 4, the second packet e2 of the E-node 5, the third packet d3 of the D-node 4, and the third packet e3 of the E-node 5 are sequentially transferred to complete the transfer of the entire data of the C-node 3, the D-node, 4, and the E-node 5.

In the example shown in FIG. 7B, the D-node 4 completes the transfer of its entire data when the transfer of eight packets of data ends (packet d3). The E-node 5 completes the transfer of its entire data when the transfer of nine packets of data ends (packet e3). The C-node 3 completes the transfer of its entire data when the transfer of three packets of data ends (packet c3). As described above, the "express" request command having the highest level of priority significantly shortens the time required to complete the transfer of data that needs to be transferred with a high level of priority.

FIGS. 8A and 8B show data transferred by the C-node 3, the D-node 4, and the E-node 5 through the IEEE 1394b bus while the B-node 2 is transferring streaming image data.

FIG. 8A shows packets transferred through the bus when only the B-node 2 is transferring data. CSP transmission is performed in the isochronous transfer mode for the streaming transfer that requires data to be transferred at constant cycles. The level of priority for the CSP transmission is defined by the "cycle start" request command in the priority determination table 40, and the level of priority for the isochronous transfer mode is defined by the "ISO_EVEN" and "ISO_ODD" request commands in the priority determination table 40.

When two packets (i1 and i2) need to be transferred in each cycle of the streaming transfer, a CSP transmission packet csp, the first isochronous transfer packet i1, and the second isochronous transfer packet i2 are transferred through the bus in each constant cycle.

In addition to the data transferred by the B-node 2, FIG. 8B shows packets transferred through the bus when each of the C-node 3, the D-node 4, and the E-node 5 requests a transmission right based on the same request command, that is, the "PH_CURRENT" request command, which transfers data in the asynchronous transfer mode.

According to the priority determination table 40, the "cycle start" request command associated with the CSP transmission packet csp and the first and second isochronous transfer packets i1 and i2 used to perform the streaming transfer has a higher level of priority than the "PH_CURRENT" request command for the transfer of an Asyc transfer packet by the C-node 3, the D-node 4, and the E-node 5. Thus, when the B-node 2 requests a transmission right to perform streaming transfer and at the same time each of the C-node 3, the D-node 4, and the E-node 5 requests a transmission right, the determination circuits 16 of the respective nodes determine that the streaming transfer packet of the B-node 2 needs to be transferred with the highest level of priority. Thus, the arbiter grants transmission permission to the B-node 2. In this case, the C-node 3, the D-node 4, and the E-node 5 must wait a certain time before transferring data (t0-t1).

When the B-node 2 completes transferring its data (t1), the arbiter grants transmission permission to each of the C-node 3, the D-node 4, and the E-node 5 in a non-biased manner.

Accordingly, the first packet d1 of the D-node 4 is transferred (t1-t2). Then, the first packet c1 of the C-node 3 is transferred (t2-t3). However, when a cycle time (ct1) at which the next streaming transfer cycle is to be started comes during the transfer of the first packet c1 of the C-node 3, the B-node 2 that needs to transfer a streaming transfer packet requests a transmission right. As a result, the arbiter grants transmission permission to the B-node 2 that has requested a transmission right having a higher level of priority than the transmission right requested by the E-node 5. The E-node 5 needs to wait for a certain time to transfer its data (t3-t4). When the B-node 2 completes transferring its data (t4), the arbiter grants transmission permission to the E-node 5 so that the E-node 5 transfers its first packet e1 (t4-t5).

When a cycle time (ct2) at which the next streaming transfer cycle is to be started comes during the transfer of the first packet e1 of the E-node 5, the B-node 2 that needs to transfer a streaming transfer packet requests a transmission right. As a result, the arbiter grants transmission permission to the B-node 2 that has requested a transmission right having a higher level of priority than the transmission right requested by the D-node 4. The D-node 4 needs to wait a certain time to transfer its data (t5-t6). When the B-node 2 completes transferring its data (t6), the arbiter grants transmission permission to the D-node 4 so that the D-node 4 transfers its second packet d2 (t6-t7). At timing t7, the B-node 2 has not yet requested a transmission right. Thus, the arbiter grants transmission permission to the C-node 3 so that the C-node 3 transfers its second packet c2 (t7-t8).

When a cycle time (ct3) at which the next streaming transfer cycle is to be started comes during the transfer of the second packet c2 of the C-node 3, the B-node 2 that needs to transfer a streaming transfer packet requests a transmission right. As a result, the arbiter grants transmission permission to the B-node 2 that requests a transmission right having a higher level of priority than a transmission right requested by the E-node 5. As a result, the E-node 5 needs to wait a certain time to transfer its data (after t8). As described above, the C-node 3 requires a long time to complete transferring its data (three packets) that needs to be transferred with the highest level of priority.

In addition to the data transferred by the B-node 2, FIG. 8C shows packets being transferred through the bus when the C-node 3 requests a transmission right based on the "express" request command with the highest level of priority and each of the D-node 4 and the E-node 5 requests a transmission right based on the same request command, that is, the "PH_CURRENT" request command, which transfers data in the asynchronous transfer mode.

According to the priority determination table 40, the "express" request command has the highest level of priority. Thus, when the C-node 3 requests a transmission right, the determination circuits 16 of the respective nodes determine that the transmission right requested by the C-node 3 has a higher level of priority than the transmission rights requested by the B-node 2, the D-node 4, and the E-node 5. As a result, the arbiter grants transmission permission to the C-node 3, so that the C-node 3 transfers its first packet c1 (t10-t11).

Next, the arbiter again grants transmission permission to the C-node 3, so that the C-node 3 transfers its second packet c2 (t11-t12). The arbiter then grants another transmission permission to the C-node 3, so that the C-node 3 transfers its third packet c3 (t12-t13). The C-node 3 that has completed transmission of every one of its packets subsequently does not generate a transmission right request signal.

Thereafter, the arbiter assigns transmission permission to each of the B-node 2, the D-node 4, and the E-node 5 in an appropriate order that is determined based on the priority level of a transmission right for a streaming transfer packet requested by the B-node 2 and transmission rights requested by the D-node 4 and the E-node 5, so that each of the B-node 2, the D-node 4, and the E-node 5 granted transmission permission transmits their packets accordingly (after t13).

In this manner, the C-node 3 that needs to transmit data with the highest level of priority requests a transmission right based on the "express" request command, so that the C-node 3 completes the transfer of its data in a transfer time corresponding to three packets of data. This guarantees immediate data transfer.

Packets transferred when a bus reset request is issued will now be described with reference to FIG. 9.

Here, it is assumed that each of the C-node 3, the D-node 4, and the E-node 5 requests a transmission right based on the same request command, that is, the "PH_CURRENT" request command that transfers data in the asynchronous transfer mode, and the B-node 2 issues a bus request based on the "bus reset" request command. As shown in FIG. 9A, the first packet d1 of the D-node 4 is first transmitted, and then the first packet c1 of the C-node 3 is transmitted. Next, the B-node 2 issues a bus reset request using the "bus reset" request command. In this case, the determination circuits 16 of the respective nodes determine that the "bus reset" request issued by the B-node 2 has a higher level of priority than the request issued by the E-node 5. Thus, a bus reset is performed. More specifically, the IEEE 1394b bus is reset at the timing when the first packet c1 of the C-node 3 is completely transmitted. The bus reset requires a predetermined time (about 200 microseconds). During the predetermined time, the C-node 3, the D-node 4, and the E-node 5 are not permitted to transfer their packets. As a result, the C-node 3 that needs to transfer its data with the highest level of priority completes transferring the data at a timing delayed at least by the predetermined time of the bus reset.

FIG. 9B shows packets being transferred through the bus when the C-node 3 requests a transmission right based on the "express" request command.

According to the priority determination table 40, the "express" request command used by the C-node 3 has a higher level of priority than the "bus reset" request command. Thus, the determination circuits 16 of the respective nodes determine that the transmission right request issued by the C-node 3 has the highest level of priority. Accordingly, the arbiter grants transmission permission to the C-node 3, so that the C-node 3 transfers its first packet c1.

Next, the determination circuits 16 determine again that a transmission right request issued by the C-node 3 has the highest level of priority based on the priority determination table 40. Thus, the arbiter grants another transmission permission to the C-node 3, so that the C-node 3 transfers its second packet c2. In the same manner, the arbiter grants another transmission permission to the C-node 3, so that the C-node 3 transfers its third packet c3. The C-node 3 that has completed the transfer of all of its packets subsequently does not issue a transmission right request.

Thereafter, the bus reset request issued by the B-node 2 has a higher level of priority than the transmission right requests issued by the D-node 4 and the E-node 5. Thus, a bus reset is performed. The timing at which transmission permission is granted to each of the D-node 4 and the E-node 5 is delayed to at least when the bus reset is completed. As described above, the C-node 3 that needs to transmit data with the highest level of priority issues a transmission right request based on the "express" request command, so that the C-node 3 completes the transfer of its data in a transfer time corresponding to three packets of data. This guarantees immediate data transfer.

The preferred embodiment has the advantages described below.

(1) The "express" request command with the highest level of priority is newly defined. Further, the 4-bit external transmission right request signals RQ1$a$ and RQ1$b$ indicating the priority of the "express" request command are newly defined. The port decoders 14$a$ and 14$b$ decode the 4-bit external transmission right request signals RQ1$a$ and RQ1$b$ corresponding to the "express" request command to the 3-bit decoded request signals X1$a$ and X1$b$ that differ from the signals generated based on request commands other than the "express" request command. Each determination circuit 16 includes the priority determination table 40 in which the 3-bit decoded request signals X1$a$ and X1$b$ corresponding to the "express" request command are associated with the command with the highest level of priority.

In this manner, a new request command having a higher level of priority than the request commands defined by IEEE 1394b is easily defined. As a result, asynchronous data that requires immediate transfer is performed with a high level of priority even when a request normally having a higher level of priority than asynchronous data transfer, such as a bus reset request, is issued.

(2) The new "express" request command easily enables a transmission right request to have a higher level of priority than the transmission right request for synchronous data transfer in the isochronous transfer mode. Further, data transfer corresponding to the "express" request command is granted transmission permission with a higher level of priority than synchronous data transfer performed in the isochronous transfer mode. This prevents the data transfer corresponding to the "express" request command from being interrupted by data transfer in the isochronous transfer mode. As a result, even when data is being transferred in the isochronous transfer mode, asynchronous data that requires immediate transfer is started with a high level of priority and completed within a short period of time.

(3) The new "express" request command easily enables a transmission right request to have a higher level of priority than a transmission right request for an asynchronous data transfer performed using the normal asynchronous data transfer mode. As a result, asynchronous data that requires immediate transfer is started with a high level of priority and completed within a short period of time.

(4) The new "express" request command enables a transmission right request signal corresponding to the "express" request command to be granted transmission permission immediately without any delayed caused by normal IEEE 1394b request signals. This guarantees immediate data transfer.

(5) The data transfer device 11 of the preferred embodiment newly defines the "express" request command having the highest level of priority that complies with existing IEEE 1394b (in other words without violating IEEE 1394b). The data transfer device 11 immediately performs data transfer corresponding to the "express" request command without greatly changing the existing system configuration and completes data transfer within a short period of time.

It should be apparent to those skilled in the art that the present invention may be embodied in many other specific forms without departing from the spirit or scope of the invention. Particularly, it should be understood that the present invention may be embodied in the following forms.

In the preferred embodiment, when two or more nodes request for a transmission right at the same time, the node requesting a transmission right based on the "express" request command obtains transmission permission with a higher level of priority than the other nodes. However, if another node is transferring a packet of data when the node obtains transmission permission, even the node that has obtained transmission permission needs to wait until the other node completes the packet transfer.

Accordingly, the determination circuit 16 of the node that is transferring a packet may immediately suspend the packet transfer when detecting the "express" request command. In this case, when one node requests a transmission right based on the "express" request command, the node requesting the transmission right is immediately permitted to transfer its data. This enables further immediate data transfer with a high level of priority.

In the preferred embodiment, data transferred by the node requesting a transmission right based on the "express" request command is in the form of packets that comply with the IEEE 1394b standard. However, the data that is transferred is not limited to IEEE 1394 data packets. To transfer a large quantity at the same time, transmission rights may be consecutively requested based on the "express" request command. Alternatively, packets may have an unlimited length. This would enable time to be efficiently used on the bus and maximize the data transfer speed of the bus. The maximized data transfer speed of the bus enables, for example, a vehicle on which the data transfer device 11 is mounted to transfer and store video data of an on-vehicle camera within a short period of time and transfer a map for its navigation system within a short period of time.

In the preferred embodiment, the node requesting a transmission right based on the "express" request command is permitted to immediately transfer its data. In, for example, a vehicle, a data transfer mechanism is categorized into two systems, an information system and a control system. This is because the information system and the control system require data to be transferred under different conditions. The control system requires highly accurate, reliable, and immediate data transfer, whereas the information system requires node connectivity, high speed transfer of a large amount of data, and non-biased communication. The data transfer device 11 of the preferred embodiment is generally categorized as an information system.

The data transfer device 11 of the preferred embodiment performs immediate and reliable data transfer. Thus, the data transfer device 11 may effectively use at least a portion of urgent data provided from a data transfer device for a control system. More specifically, the data transfer device 11 may receive information transmitted from an apparatus for a control system based on information on the acceleration speed detected by an acceleration sensor arranged in a vehicle. When receiving such data, the data transfer device 11 may immediately transfer the data. This enables, for example, a node including a data recording apparatus to immediately receive the data and move a data reading head in response to the received data.

In other words, the data transfer device 11 of the preferred embodiment may be used not only to transmit information associated with an information system but also to transmit information associated with a control system.

In the preferred embodiment, the "express" request command having the highest level of priority is defined using IEEE 1394b standard. However, the present invention is not limited to this method. The present invention may be embodied as a data transfer device in which a plurality of nodes are connected to one another in compliance with a standard other than IEEE 1394b, which each node being required to obtain transmission permission or a bus use right to transmit data.

In the preferred embodiment, the data transfer device having the full-duplex communication function obtains transmission permission based on its transmission right request signal. However, the present invention is not limited to this method and may be applied to a data transfer device that performs half-duplex communication. In this case, although transmission permission is not obtained as immediate as when performing full-duplex communication, even the half-duplex communication will enable asynchronous data to be transferred immediately at an early timing.

Figure 10:
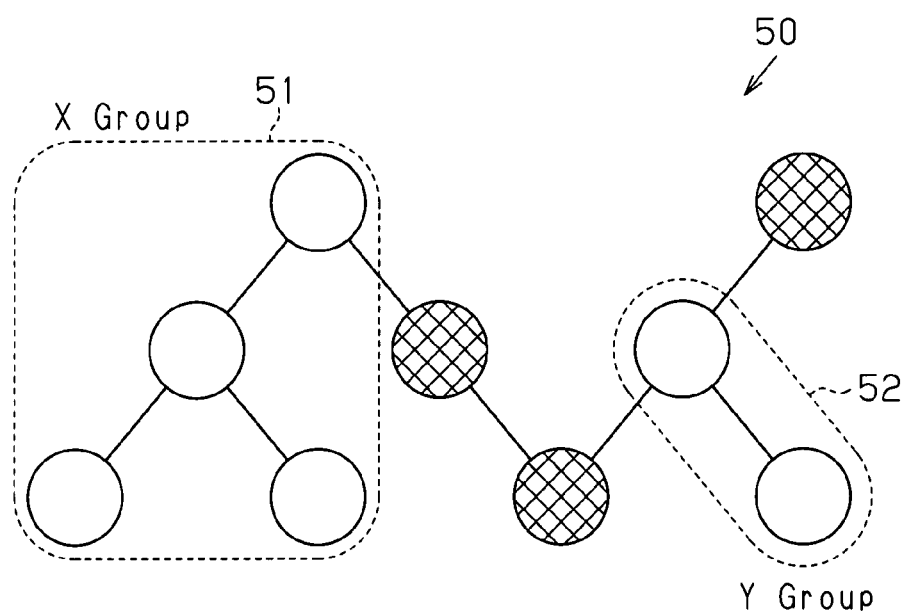
FIG. 10 is a block diagram of a data transfer system in which standard nodes and extension nodes coexist.

In the preferred embodiment, the nodes all determine that an "express" request command has been generated. However, the present invention is not limited in this manner. The bus topology may be modified to include nodes that cannot detect the "express" request command. In this case, as shown in FIG. 10, nodes that need to use the "express" request command may be connected to one another. In a topology 50 shown in FIG. 10, nodes belonging to an X group 51 and a Y group 52 are all extension nodes that determine the generation of an "express" request command. The other nodes are standard nodes that cannot determine the generation of the "express" request command. In this case, the standard nodes cannot detect the "express" request command. Thus, the standard nodes ignore a transmission right request issued based on the "express" request command. As a result, although the transmission right request issued based on the "express" request command is not transmitted between the X group 51 and the Y group 52, the transmission right request issued based on the "express" request command is transmitted between the nodes included in the X group 51 and between the nodes included in the Y group 52. Accordingly, the standard nodes and the extension node can be connected in an appropriate manner to coexist on the same bus.

The present examples and embodiments are to be considered as illustrative and not restrictive, and the invention is not to be limited to the details given herein, but may be modified within the scope and equivalence of the appended claims.

What is claimed is:

1. A data transfer device comprising:
   a request signal generation circuit generating a plurality of existing request signals with different levels of priority;
   a top priority request signal generation unit configured to generate a top priority request signal that requests a bus use right to transmit data to a network and that has the top priority and that differs from the plurality of existing request signals; and
   a determination circuit determining which one of the request signals input to the determination circuit has the highest priority, wherein the determination circuit includes a priority determination table in which the top priority request signal that requests a bus use right to transmit data to a network is set to have a level of priority that is higher than the levels of priority of the plurality of existing request signals.

2. The data transfer device according to claim 1, further comprising:
   a decoder extracting an existing request signal from data or a request transferred between a plurality of nodes included in the network and providing the extracted existing request signal to the determination circuit, the decoder configured so as to be capable of extracting the top priority request signal from the data or the request and providing the extracted top priority request signal to the determination circuit.

3. The data transfer device according to claim 1, wherein the determination circuit suspends the transfer of data to the network when determining from the priority determination table that the top priority request signal has been generated.

4. The data transfer device according to claim 1, wherein the transfer of data and a request between a plurality of nodes included in the network is performed through full-duplex communication.

5. The data transfer device according to claim 1, wherein the data transfer device is arranged in a node that is included in the network and that transfers data and a request based on IEEE 1394b-2002 standard.

6. The data transfer device according to claim 1, wherein the top priority request signal is not defined by the IEEE 1394b-2002 standard.

7. A data transfer device transferring data arranged in a node included in a network complying with a communication standard of IEEE 1394b-2002, the data transfer device comprising:
   a request signal generation circuit generating a plurality of standard request signals, each having a level of priority defined by the communication standard of IEEE 1394b-2002, and generating an extended request signal that requests a bus use right to transmit data to the network and that has the top priority and that is non-defined by the communication standard of IEEE 1394b-2002 and that differs from the standard request signals; and
   a determination circuit including a priority determination table in which the extended request signal that requests a bus use right to transmit data to the network has a level of priority set higher than the levels of priority of the standard request signals, wherein the determination circuit determines from the priority determination table which one of the request signals input to the determination circuit has the highest level of priority.

8. The data transfer device according to claim 7, wherein the standard request signals include a bus reset request signal, and the level of priority of the extended request signal is higher than that of the bus reset request signal.

9. The data transfer device according to claim 7, further comprising:
   a decoder extracting an extended request signal from data or a request received from another node, and providing the extracted extended request to the determination circuit.

* * * * *